United States Patent [19]

Lerner

[11] Patent Number: 4,661,182
[45] Date of Patent: Apr. 28, 1987

[54] METHOD AND COMPOSITION FOR REPAIRING MINOR SURFACE DAMAGE TO COATED SURFACES

[75] Inventor: Stanley Lerner, Highland Park, Ill.

[73] Assignee: Color Communications, Inc., Chicago, Ill.

[21] Appl. No.: 761,051

[22] Filed: Jul. 31, 1985

[51] Int. Cl.⁴ ............................................. B32B 35/00
[52] U.S. Cl. .................................... 156/94; 29/402.09; 156/247; 156/289; 264/36; 427/140; 428/40; 428/63
[58] Field of Search ............... 29/402.09; 156/94, 247, 156/289; 264/36; 427/140; 428/40, 63

[56] References Cited

U.S. PATENT DOCUMENTS

| | | | |
|---|---|---|---|
| 4,061,516 | 12/1977 | George et al. | 156/94 |
| 4,451,522 | 5/1984 | de Vroom | 428/201 |
| 4,473,419 | 9/1984 | Hardy | 428/40 X |
| 4,497,851 | 2/1985 | de Vroom | 427/147 |

FOREIGN PATENT DOCUMENTS 1232971  5/1971  United Kingdom .

Primary Examiner—Robert A. Dawson
Attorney, Agent, or Firm—Fitch, Even, Tabin & Flannery

[57] ABSTRACT

A method and paint damage repair device is disclosed; the device comprising a transparent polymeric film base, a paint coating on the surface of the film base, an adhesive on the paint coated film base and a removable paper backing on the adhesive for removal to expose the adhesive for adhesive application of the paint coated film base to the damage painted surface for the repair of such surface.

25 Claims, 8 Drawing Figures

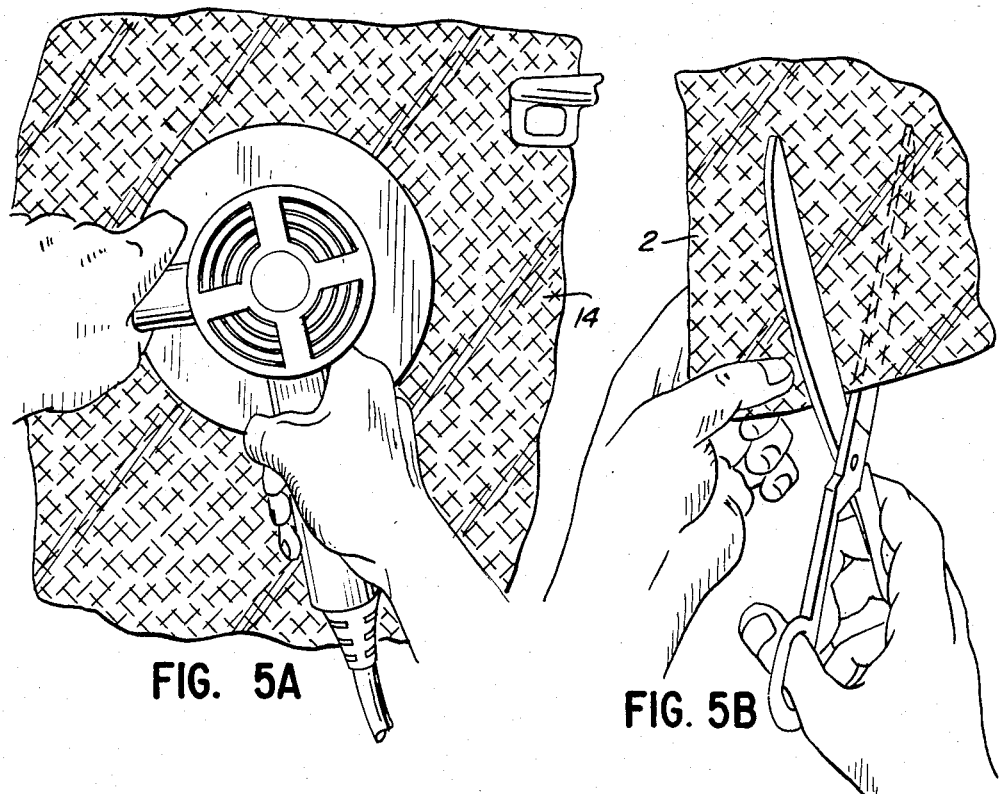
FIG. 5A
FIG. 5B
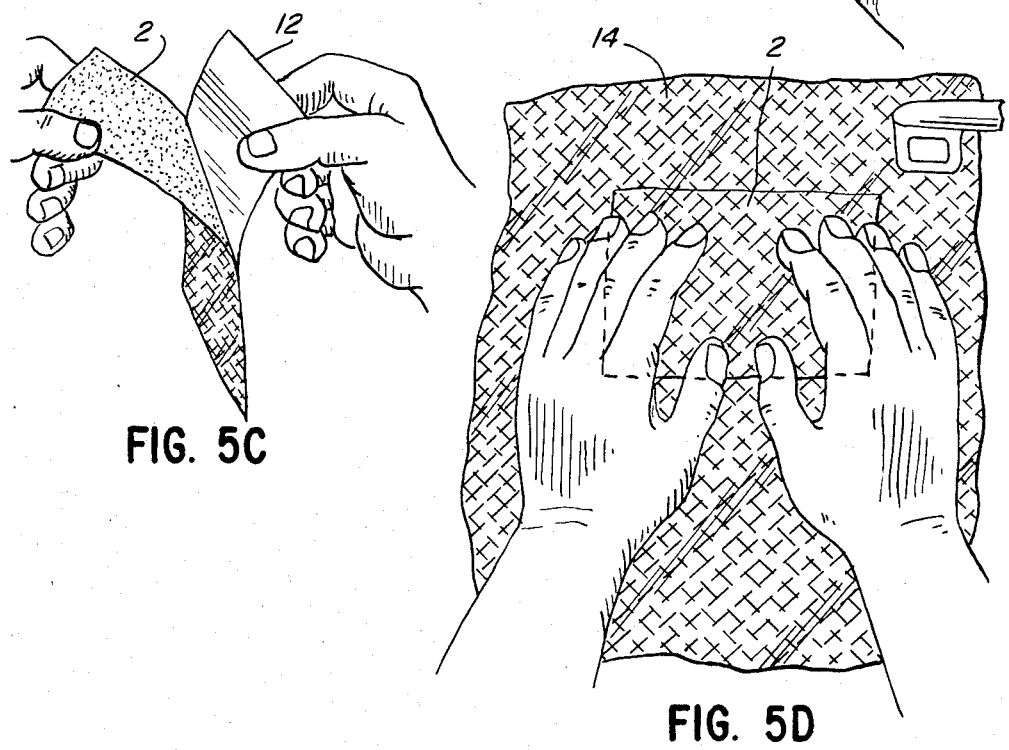
FIG. 5C
FIG. 5D

METHOD AND COMPOSITION FOR REPAIRING MINOR SURFACE DAMAGE TO COATED SURFACES

The present invention relates to a coated polymeric sheet for repairing minor surface damage to coated surfaces. More particularly, the present invention relates to a coated polymeric repair sheet for application as an overlying repair patch to a damaged surface, whereby the damaged surface is hidden and appears repaired by virtue of the overlying coated polymeric sheet adhesively affixed thereto.

The repair of minor damage to painted surfaces, especially motor vehicles, has been a nagging problem particularly for the home repairman. Enamel or lacquer paints on motor vehicles provide difficult subjects for the home repairman to repair minor damage commonly called "touchup" work. Once the minor scrape, scratch or abrasion is encountered on the body of a motor vehicle, a person about to repair the motor vehicle is faced with sanding the particular damaged area and then painting it either by brush or spray methods. Each of the latter methods have their disadvantages. The brush method tends to give the painted area brush strokes that do not conform to the original automobile finish. Spraying is often difficult in that the home repairman often has to apply several coats of spray, carefully dusting the area with paint with careful attention being paid not to overspray the area in one application so as to avoid accumulative dripping of paint. Even when proper dusting of the spray paint is achieved for a proper coating, the home repairman encounters clouds of spray paint which he should not breathe, and are ruinous to his clothing and anything else that happens to be in the general area of the repair work and spray.

Similar problems are encountered to the home repairman in repairing minor scratches or abrasions on wood furniture surfaces. An area has to be sanded, a varnish or stain matched with the wood surface to be repaired, the repairman carefully matching stain, strokes and gloss to the finish already on the wood surface.

With respect to paint touchup work on motor vehicles, U.S. Pat. No. 4,497,851 suggests that transferable enamel may be used to repair minor surface damage to vehicle bodies. An enamel layer is coated on a release layer applied to carrier film such as polyethylene terephthalate. In one embodiment a pressure sensitive adhesive layer is provided between the paint layer and the release layer. The surface damage is repaired by peeling the enamel film from the carrier film and then adhesively affixing the paint layer to the damaged surface. The removal of the carrier film unless carefully done damages the paint layer. Also the paint layer is relatively fragile and difficult to apply to the damaged surface. In a second embodiment, the adhesive is applied to the outer surface of paint characters or figures.

According to the present invention a paint coated substrate of polyethylene terephthalate or polypropylene film is coated with a paint coating. When polypropylene film is used the polypropylene surface which is paint coated is provided with an acrylic film such that the paint will adhere to the polypropylene. A pressure sensitive adhesive is applied to the paint coated polymeric film, preferably to the surface of the paint coating on the polymeric substrate. A backing paper then is applied to the pressure sensitive adhesive preferably with the surface of the paper applied to the adhesive being siliconized to facilitate the release of the paper from the adhesive.

As used herein, paint means a mixture of a pigment and a suitable liquid to form a closely adherent color coating when spread on a substrate surface in a thin coat and then dried. As used herein, paint includes enamels, latex and lacquers including those based upon nitrocellulose, varnishes and stains.

The paint coated sheet enables the touchup work to be carried out by adhesively affixing the sheet as a patch to the damaged surface. In respect to motor vehicle body repair, the patch is not only easy to use, but provides a protective membrane or film to protect the vehicle surface from deterioration and further damage such as rust and abrasion.

The coated sheet of the invention also enables the repair of a motor vehicle body surface with a composition which provides a glossy surface when the adhesive is applied to the paint coated side of the polymeric sheet. The glossy surface has heretofore been difficult to duplicate in paint touchup work especially by the individual vehicle owner working at home.

Accordingly, an object of the present invention is to provide a composition which includes paint in dry condition to be applied to a damaged painted surface so that touchup work can be performed by adhesively affixing the composition to the painted surface.

Another object of the invention is to provide a composition with a painted surface such that when the composition is adhesively affixed to a damaged painted surface the composition would provide a glossy appearance.

Still another object of the present invention is to provide a composition for the repair of a painted surface wherein such composition will provide a protective film for the protection of the surface against further damage and deterioration.

Other objects and advantages of the invention will become apparent from the following detailed description taken in connection with the accompanying drawings in which:

FIGS. 5(A) through (D) is a perspective schematic view of the the painted polymeric sheet shown in FIG. 1 being applied to a damaged surface.

Figure 1:
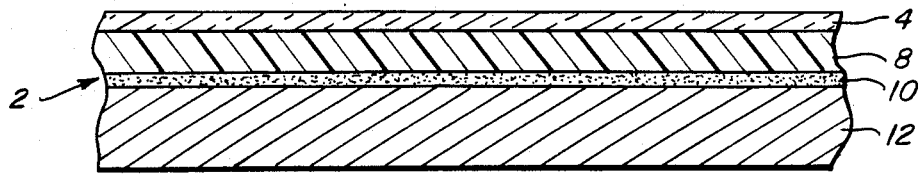
FIG. 1 is an enlarged cross-sectional view of a painted organic polymeric sheet with a paper backing on an adhesive layer made in accordance with the preferred embodiment of the invention.

Referring now to the preferred embodiment of the invention which is shown in FIG. 1 of the drawings, a coated polymeric sheet 2 comprises a transparent base sheet 4 coated with a paint layer 8 which paint layer is coated with a pressure sensitive adhesive layer 10. A backing sheet 12 made of paper or the like is releasably applied to the adhesive layer. Preferably, the base sheet 4 of the coated polymeric repair sheet is polyethylene terephthalate film which is sold by E. I. du Pont de Nemours & Co. under the registered trademark Mylar. However, the base sheet 4 may be a polypropylene film having an acrylic film to enhance the adherence of the paint layer. The base sheet has a thickness range of ¼ mil to 2 mils with the thickness preferably about ½ mil. The polymeric base 4 is coated with the paint layer 8 preferably by the use of a knife over roll coating operation as is known in the art. A pressure sensitive adhesive layer 10 is applied to the paint by spraying or by a doctor blade as is known in the art. The adhesive layer may be a copolymer acrylic adhesive which has a low shear and high tech dry film. Such an adhesive is available from Ajax Adhesives Industries, Inc. as Ajax Resin Adhesive AC-794. Preferably the surface of the backing sheet 12 which is applied to the pressure sensitive adhesive layer is siliconized as is known in the art to facilitate release of the backing sheet from the adhesive prior to the application of the polymeric sheet to the surface to be repaired.

Figure 2:
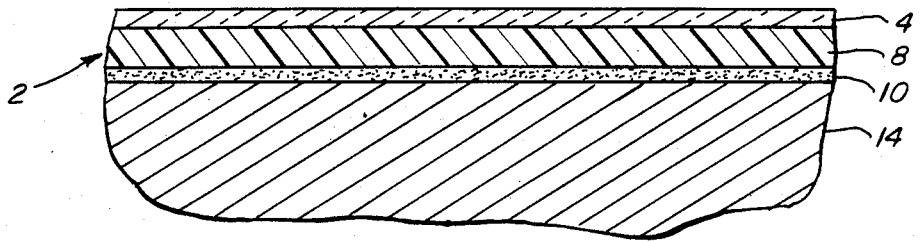
FIG. 2 is an enlarged cross-sectional view of the painted organic polymeric sheet shown in FIG. 1 with the paper backing removed, the polymeric sheet mounted on the body surface of a motor vehicle.

FIG. 2 illustrates one application of the invention wherein the painted polymeric sheet 2 is affixed to the surface to be repaired with the transparent base sheet 4 facing away from a damaged surface 14. In FIG. 2, the backing sheet 12 has been removed from the painted polymeric sheet 2 thereby exposing the adhesive layer 10, the adhesive layer adhesively affixing the polymeric sheet to the damaged surface 14. The paint layer 8 is thus viewed through the transparent polymeric base sheet 4 which gives the paint a glossy appearance which is especially desirable for the repair of motor vehicles which frequently are painted with a glossy paint. Hence, a glossy finish is obtained without the problem of buffing a paint surface which has been applied by brush or spray.

Figure 3:
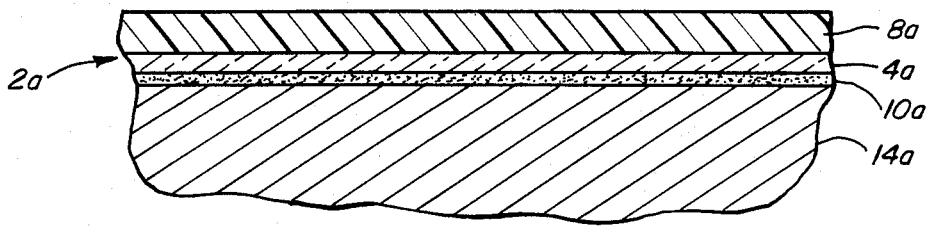
FIG. 3 is an enlarged cross-sectional view of another embodiment of the invention wherein one surface of the base polymer is coated with an adhesive and the other surface of the base polymer is coated with paint.

Referring now to FIG. 3, wherein a second embodiment of the invention is shown, the polymeric sheet is arranged for direct display of a paint coating and its finish. Similar layers to those in FIG. 1 are referred to by the same reference numeral and the subscript "a". The paint layer 8a is applied to one surface of the polymeric base 4a, and the opposite surface of the polymeric base 4a is coated with the adhesive layer 10a which adhesively affixes the coated polymeric sheet to the base surface 14a which is damaged. In this way, the paint layer 8a faces away from the surface to be repaired.

Figure 4:
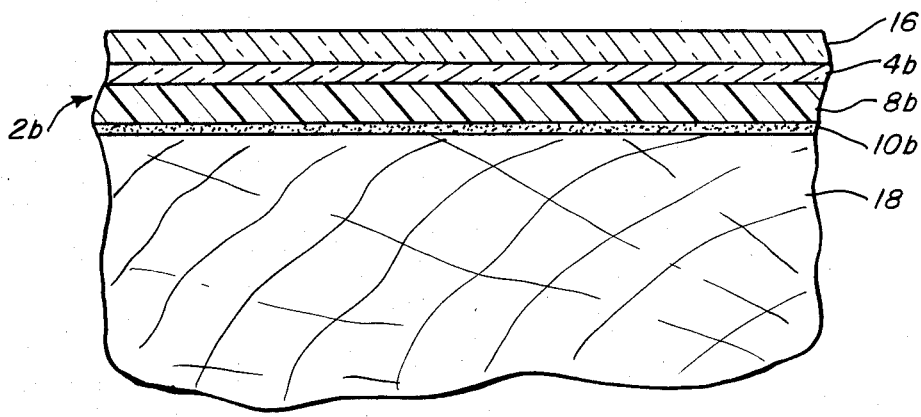
FIG. 4 is an enlarged cross-sectional view of still another embodiment of the invention wherein the polymeric sheet is additionally coated with a lacquer solution for gloss control.

With respect to the repair of some surfaces, especially wood surfaces, it is important to provide a plurality of finish or gloss variations of the paint coating. This can be achieved by utilizing the transparent or translucent properties of the polymeric film. As seen in FIG. 4, wherein similar layers to those in FIG. 1 are referred to by the same reference numeral and subscript "b", one side of the polymeric base 4b or the "top side" is coated with a clear lacquer solution forming a lacquer film 16 which can provide an almost unlimited number of variations of gloss to the paint 8b on the polymeric sheet. Lacquers which may be used in the embodiment of FIG. 4 include nitrocellulose lacquer and acrylic lacquer inks. The lacquer ink may be coated on the film by knife roll coating operation or by a painting process. The clarity of the lacquer ink is used to control the appearance or the gloss of the paint coating when viewed through the lacquer ink and polymeric base. The composition of lacquer ink controls its clarity, completely clear lacquer ink providing a glossy finish. Lacquer ink such as nitrocellulose lacquer ink may be purchased in forms which will yield varying finishes including gloss, semi-gloss and flat finishes. Alternatively, magnesium silicate and silica may be added to clear lacquer ink to provide a flatter appearance to control gloss with such gloss control being used to control the appearance of the repair sheets for such purposes as furniture repair.

As shown in FIG. 4, the paint coating 8b to be displayed is applied to the polymeric base 4b on the side of the film facing the surface 18 onto which the sheet is mounted or on the opposite side of the translucent film 16 through which the paint coating 8b will be viewed (hereinafter the "bottom side" of the polymeric base coat). The side of the polymeric base with the paint coating or the bottom side, has the adhesive 10b applied thereto to affix the lacquer and paint coated polymeric sheet to the surface 18 to be repaired.

Important to all aspects of the invention is the use of translucent polymeric film. Important to the use of polypropylene as a translucent film is that it is coated with an acrylic based terpolymer coating composition resin containing wax and silica at least on the side of the film having the paint coating. The acrylic coating is needed for the paint coating to adhere to the polypropylene. The acrylic coating is not necessary for polypropylene to adhere and accommodate the lacquer ink and adhesive coatings. The terpolymer coating is described in U.S. Pat. Nos. 3,753,769 and 4,058,645 to Steiner and assigned to Mobil Oil Corporation. These patents are incorporated by reference as if fully rewritten herein. An oriented transparent polypropylene film both surfaces of which are coated as described herein and in U.S. Pat. Nos. 3,753,769 and 4,058,645 is commerically available as Bicor 220AB from the Mobil Chemical Company.

Referring to FIG. 5 in respect to the application of the paint coated polymeric repair sheet 2 of FIG. 1, the area around the damaged surface of the automobile 14 is preferably cleaned with an abrasive such as emery paper, steel wool and the like as in FIG. 5A. A patch 2 of a color matching the finish of the automobile is then cut to an appropriate size relative to the damaged surface and the backing layer 12 is then removed from the polymeric sheet, as shown in FIGS. 5B and 5C. After the backing 12 is removed the polymeric repair sheet 2 is applied to the damaged area as shown in FIG. 5D. The repair sheet 2 hides the damage in the surface and is not noticeable except by careful inspection.

While the repair of surfaces of motor vehicle bodies and wood furniture has been described the composition and method is appropriate to any painted surface which has sustained minor damage. Hence it should be understood that while certain embodiments of the present invention have been illustrated and described, various modifications thereof will become apparent to those skilled in art, and accordingly, the scope of the present invention should be defined only by the appended claims and equivalents thereof.

Various features of the invention are set forth in the following claims.

What is claimed is:

1. A method for repairing a damaged painted surface, said method comprising
    adhesively affixing a paint coated polymeric sheet to the damaged surface to provide a repaired surface covered with the paint coated polymeric sheet which polymeric sheet remains on the damaged surface, the paint coated polymeric sheet including a film base having a thickness in the range of about 0.00025 to about 0.002 inches;

a paint coating on the surface of said film base; and an adhesive coating for adhesively affixing the paint coated polymeric sheet to the damaged surface.

2. A method in accordance with claim 1 wherein the adhesive is on the painted surface of said film base.

3. A method as recited in claim 1 wherein the paint coated polymeric sheet further comprises a lacquer ink coating on the surface of the film base to control the appearance of the finish of the paint coating.

4. A method as recited in claim 1 wherein said film base is polyethylene terephthalate.

5. A method for repairing a damaged painted surface, said method comprising providing a paper backed paint coated polymeric sheet including a film base having a thickness in the range of about 0.0005 to about 0.002 inches;

a paint coating on the surface of said film base;

an adhesive coating for adhesively affixing the paint coated polymeric sheet to the damaged surface, and a paper backing on the adhesive;

removing the paper backing from the adhesive to expose the adhesive for application of the sheet to the surface to provide a paint coated polymeric sheet surface; and adhesively affixing the paint coated polymeric sheet to the damaged painted surface to provide a repaired surface covered with the paint coated polymeric sheet which polymeric sheet remains on the damaged surface.

6. A method in accordance with claim 5 wherein the film base has a thickness of about 0.0005 inch.

7. A method in accordance with claim 5 wherein the adhesive is on the painted surface of said film base.

8. A method as recited in claim 5 wherein the paint coated polymeric sheet further comprises a lacquer coating on the surface of the film base to control the appearance of the finish of the paint coating.

9. A method as recited in claim 5 wherein said film base is polyethylene terephthalate.

10. A method as recited in claim 6 wherein said film base is polyethylene terephthalate.

11. A paint damage repair device for the repair of damage to a painted surface, said device comprising:

a transparent polymeric film base having a thickness in the range of about 0.0005 to about 0.002 inches;

a paint coating affixed on the surface of said film base;

an adhesive on the paint coated polymeric film base; and a removable paper backing on the adhesive for removal to expose the adhesive to adhesively affix the paint coated film base to the damaged painted surface to provide a repaired surface covered with the paint coated polymeric sheet which polymeric sheet remains on the damaged surface.

12. A paint damage repair device in accordance with claim 11 wherein the film base has a thickness of about 0.0005 inch.

13. A paint damage repair device in accordance with claim 11 wherein the adhesive is on the painted surface of said film base.

14. A paint damage repair device in accordance with claim 11 wherein the paint coated polymeric sheet further comprises a lacquer ink coating on the surface of the film base to control the appearance of the finish of the paint coating.

15. A paint damage repair device in accordance with claim 11 wherein said removable paper backing is siliconized to facilitate removal of said paper backing from the adhesive.

16. A paint damage repair device in accordance with claim 12 wherein the film base is polyethylene terephthalate.

17. A method for repairing a damaged painted surface, said method comprising adhesively affixing a paint coated polymeric sheet to the damaged surface, the paint coated polymeric sheet including a film base having a thickness in the range of about 0.00025 to about 0.002 inches;

a paint coating on the surface of said film base; and an adhesive coating on the unpainted surface of said film base for adhesively affixing the paint coated polymeric sheet to the damaged surface.

18. A method for repairing a damaged painted surface, said method comprising providing a paper backed paint coated polymeric sheet including a film base having a thickness in the range of about 0.0005 to about 0.002 inches;

a paint coating on the surface of said film base;

an adhesive coating on the unpainted surface of the film base for adhesively affixing the paint coated polymeric sheet to the damaged surface, and a paper backing on the adhesive;

removing the paper backing from the adhesive to expose the adhesive for application of the sheet to the surface to provide a paint coated polymeric sheet surface; and adhesively affixing the paint coated polymeric sheet to the damaged painted surface.

19. A method as recited in claim 1 wherein said film base is polypropylene.

20. A method as recited in claim 5 wherein said film base is polypropylene.

21. A method as recited in claim 11 wherein said film base is polypropylene.

22. A paint damage repair device for the repair of damage to a painted surface, said device consisting essentially of:

a transparent polymeric film base having a thickness in the range of about 0.0005 to about 0.002 inches;

a paint coating affixed on the surface of said film base;

an adhesive on the paint coated polymeric film base; and a removable paper backing on the adhesive for removal to expose the adhesive to adhesively affix the paint coated film base to the damaged painted surface for the repair of said surface to provide a repaired surface covered with the painted coated polymeric sheet which remains on the damaged surface.

23. A paint damage repair device in accordance with claim 22 wherein the adhesive is on the painted surface of said film base.

24. A paint damage repair device in accordance with claim 22 wherein said film base is polyethylene terephthalate.

25. A paint damage repair device in accordance with claim 22 wherein said film base is polypropylene.

* * * * *